July 13, 1954  R. I. PATTEN  2,683,532

SEED GRADING, CLEANING, AND TREATING APPARATUS

Filed March 9, 1953  3 Sheets-Sheet 1

Ray I. Patten
INVENTOR.

July 13, 1954 R. I. PATTEN 2,683,532
SEED GRADING, CLEANING, AND TREATING APPARATUS
Filed March 9, 1953 3 Sheets-Sheet 2

Ray I. Patten
INVENTOR.

BY Clarence A. O'Brien
and Harvey B. Jackson
Attorneys

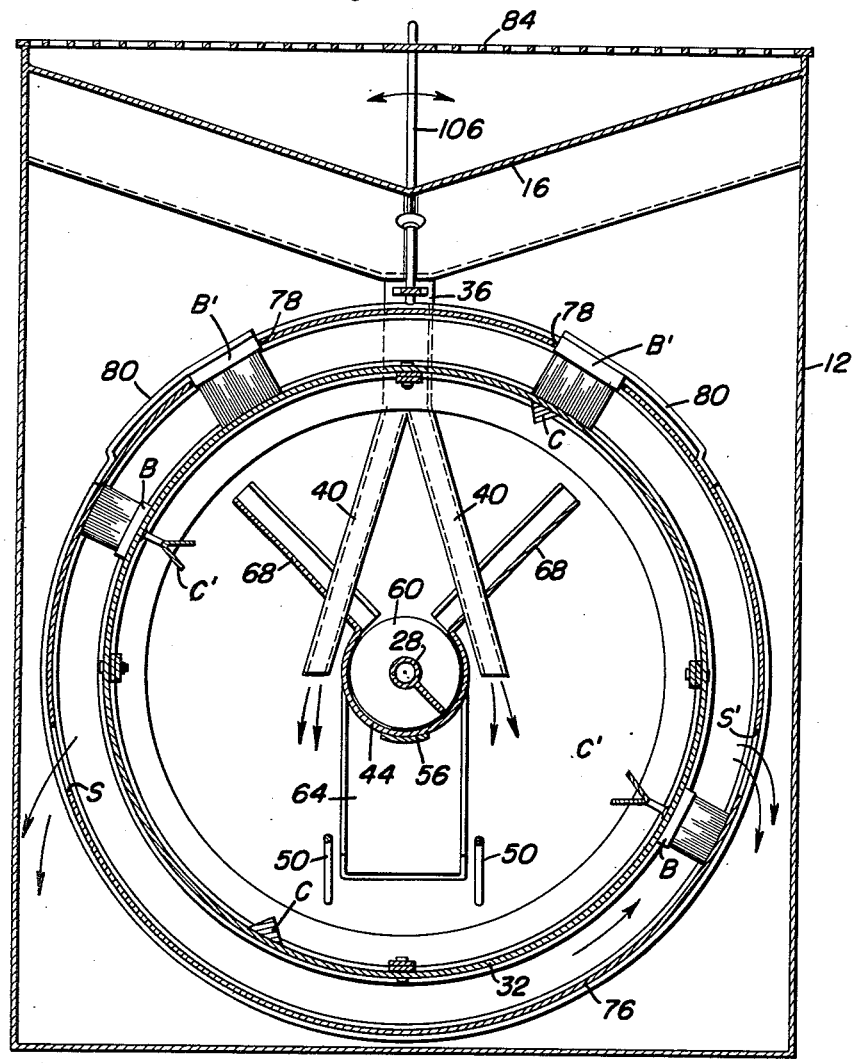

Patented July 13, 1954

2,683,532

UNITED STATES PATENT OFFICE 2,683,532

SEED GRADING, CLEANING, AND TREATING APPARATUS

Ray I. Patten, Stanley, Wis.

Application March 9, 1953, Serial No. 340,954

9 Claims. (Cl. 209—294)

This invention relates to new and useful improvements in seed handling apparatus and the primary object of the present invention is to provide automatic rotor gravity seed grader, and treater.

Another important object of the present invention is to provide seed grading, cleaning and treating apparatus involving a rotory slitted sieve cylinder that will effectively separate large seeds from foreign matter and smaller seeds as the cylinder is rotated.

Yet another object of the present invention is to provide a seed grading, cleaning and treating apparatus including novel and improved means for brushing the outer periphery of the cylinder as the latter rotates and for collecting material passing through the slits in the cylinder.

A further object of the present invention is to provide a seed grading, cleaning and treating apparatus involving novel and improved discharge means whereby relatively large seeds may be discharged from the rotating cylinder or directed back into the cylinder for continued processing.

A still further aim of the present invention is to provide a seed grading, cleaning and treating apparatus wherein the parts are readily and quickly assembled or disassembled for handling seeds of the different grades, and which apparatus is extremely simple and practical in construction, strong and reliable in use, efficient and durable in operation, inexpensive to produce, service and maintain, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged transverse vertical sectional view taken substantially on the plane of section line 3—3 of Figure 1.

Figure 1:
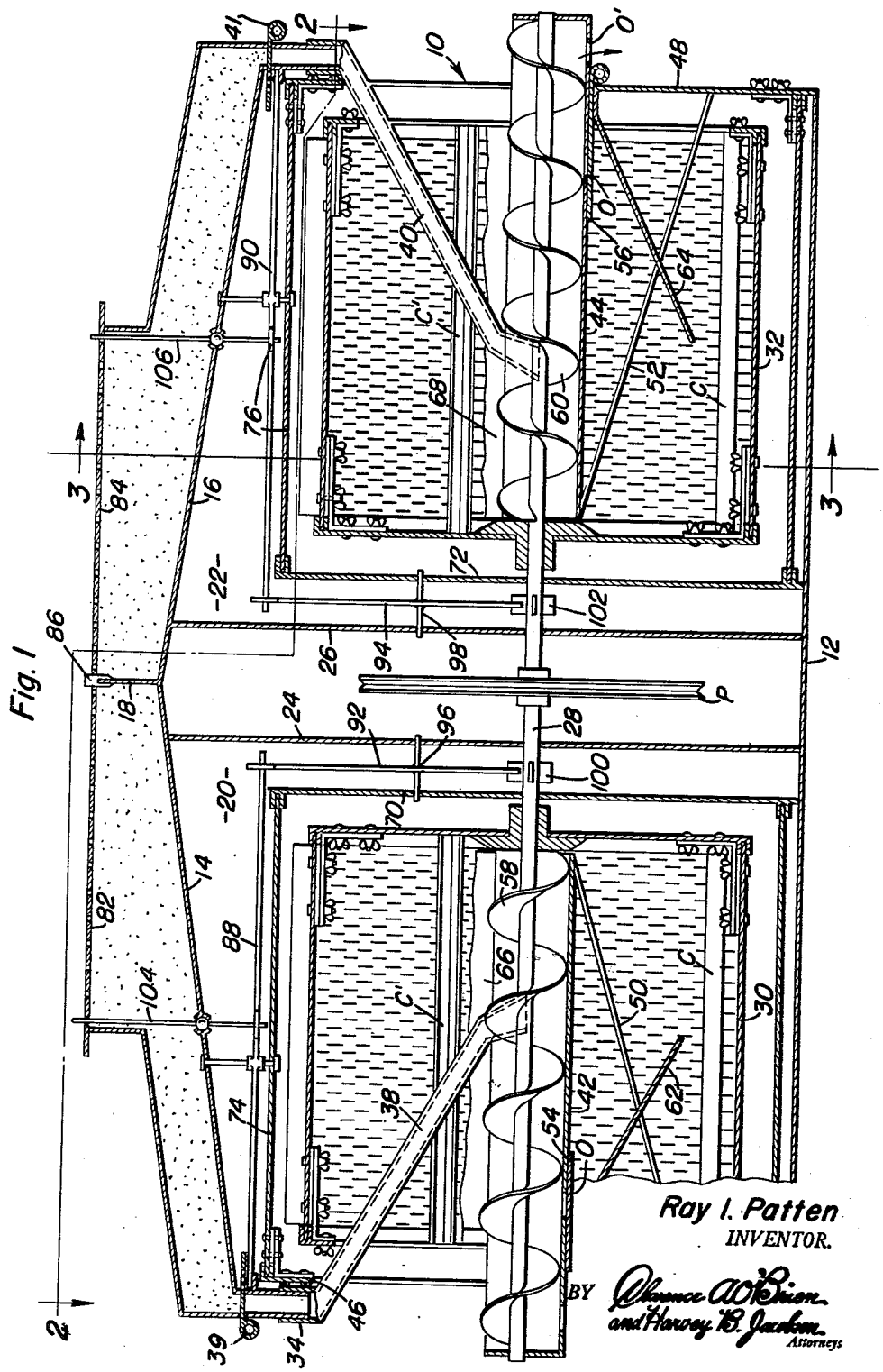
Figure 1 is a longitudinal vertical sectional view taken substantially through the center of the present seed grading, cleaning and treating apparatus.
Figure 2:
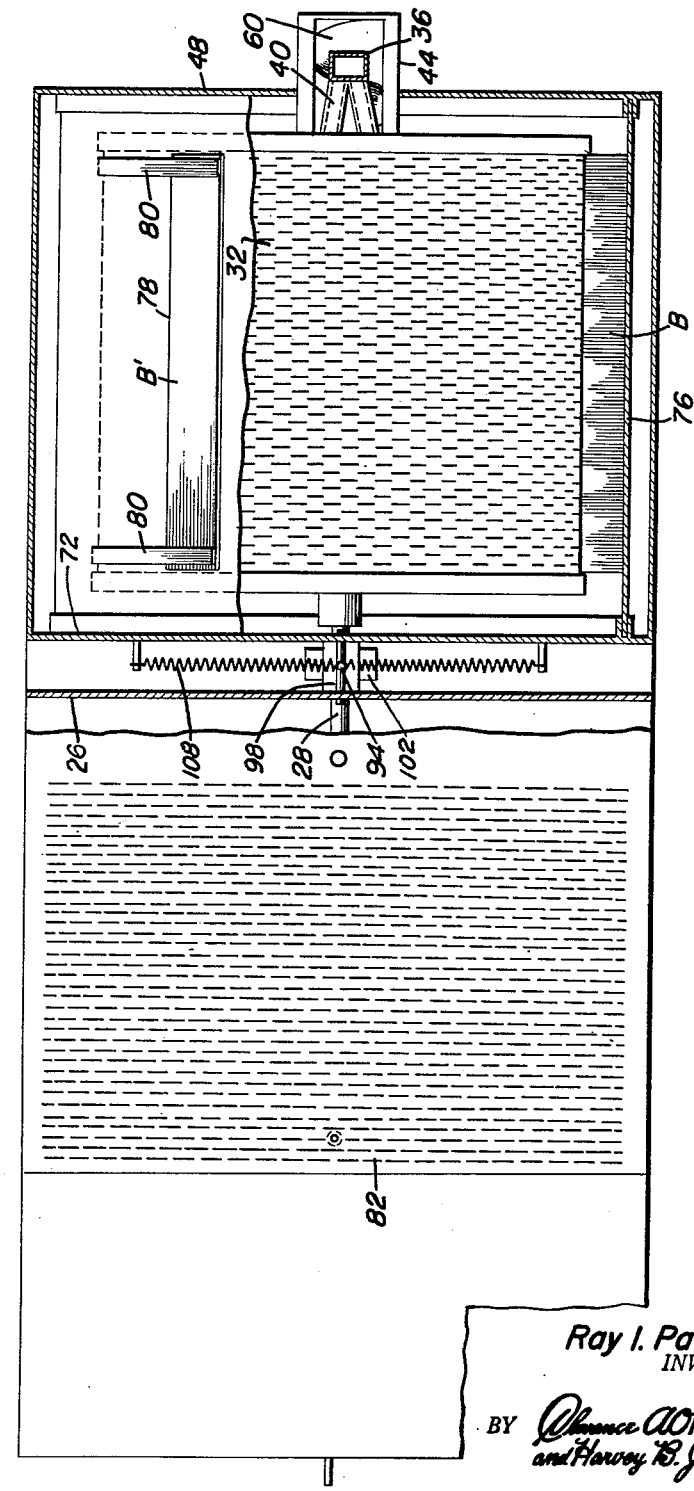
Figure 2 is a longitudinal sectional view taken substantially on the plane of broken section line 2—2 of Figure 1.

Referring now to the drawings in detail, wherein for the purpose of illustration, there is disclosed a preferred embodiment of the present invention, the numeral 10 represents the seed grading, cleaning and treating apparatus generally, including an elongated housing member 12 having upper downwardly extending V-shaped hopper portions 14 and 16 divided by a partition wall 18. The housing member 12 is divided into two end compartments 20 and 22 by spaced parallel vertical partition walls 24 and 26.

A horizontal shaft 28 extends through registering apertures in the walls 24 and 26 and into the compartments 20 and 22. Suitable bearings (not shown) may be mounted on the walls 24 and 26 to rotatably support shaft 28. The inner end walls of a pair of slitted sifter cylinders 30 and 32 are suitably fixed on the shaft 28 for rotation therewith and the cylinders 30 and 32 are disposed within the compartments 20 and 22, respectively.

The lower ends of the hopper portions 14 and 16 are provided with downwardly extending discharge chutes 34 and 36 having bifurcated lower portions 38 and 40 that are disposed within the cylinders 30 and 32, whereby the seeds in the hopper portions may be discharged into the cylinders 30 and 32. The upper ends of the chutes 34 and 36 slidably support valve plates 39 and 41 which are manually moved to control the passage of seeds from the hopper portions 14 and 16 into the cylinders 30 and 32.

Horizontal troughs 42 and 44 are supported by the end walls 46 and 48 of the housing member 12 and extend into the cylinders 30 and 32 through the open outer ends thereof. Brace and support rods 50 and 52 are fixed to the end walls 46, 48 and to the troughs 42, 44 to support the troughs horizontally within the cylinders. The troughs 42, 44 are each provided with inner and outer discharge openings O and O', the latter being disposed exteriorly of the housing member 12 and the former communicating with the interior of the cylinders 30 and 32. Slide valves 54 and 56 are slidably carried by the end walls 46 and 48 for selectively covering the openings O and O'.

Auger blades 58 and 60 are fixed on the shaft 28. The blades 58 and 60 are located within the troughs 42 and 44 and will move seeds through the troughs towards the openings O and O' so that the seeds may be discharged into the cylinders or outwardly from the housing member, depending upon which of the discharge openings O and O' are closed by the valves 54 and 56.

The troughs 42 and 44 are disposed between the furcations of the bifurcated chute portions 38 and 40 so that seeds passing from the discharge chutes will enter the cylinders 30 and 32 rather than the troughs. Downwardly and inwardly inclined baffle plates 62 and 64 are fixed to the end walls 46 and 48 of housing member 12 and underlie the openings O in troughs 42 and 44 to direct seeds leaving the troughs through the openings O toward the central portions of the sifting cylinders 30 and 32.

Troughs 42 and 44 are provided with upwardly flared longitudinal portions or upwardly diverging side walls 66 and 68 so that seeds lifted by the cylinders 30 and 32 will readily drop into the troughs. Longitudinally extending circumferentially spaced lifting cleats or scoops C and C' are suitably secured to the inner periphery of the cylinder 30 and 32 and these cleats will lift or scoop seeds as the cylinders rotate so that the seeds will gravitate into the troughs 42 and 44.

Casings 70 and 72 are removably supported within compartments 20 and 22 and enclose the cylinders 30 and 32. The casings 70 and 72 are provided with cylindrical walls 74 and 76 concentric with the cylinders 30 and 32. The cylindrical walls 74 and 76 are each provided with outlet slots S and S'.

Circumferentially spaced longitudinally extending brushes B are fixed to the outer peripheries of the cylinders 30 and 32 and ride against the inner peripheries of the cylindrical walls 74 and 76 to brush material passing through the slits in cylinders 30 and 32 toward the slots S and S'. The cylindrical walls 74 and 76 are provided with slots 78 that receive longitudinally extending brushes B' which are secured to the outer peripheries of the cylindrical walls 74 and 76 by resilient straps 80 that yieldingly urge the brushes B' through the slots 78 and against the outer peripheries of the cylinders 30 and 32 to clean or brush the cylinders 30 and 32. The strips 80 will flex as the brushes B ride against the brushes B' so that the latter brushes may move outwardly through the slots 78 to permit the brushes B to clear the brushes B' as the cylinders 30 and 32 are rotated.

The open tops of the hopper portions 14 and 16 are covered by sifting screens or perforated plates 82 and 84. The inner adjacent ends of the plates 82 and 84 are hinged, as at 86, to the wall 18, whereby the plates 82 and 84 may swing horizontally.

Means is provided for oscillating the plates 82 and 84 so that seeds placed on these plates may be sifted therethrough and into the hopper portions whereas straw and the like will not pass through the perforations in plates 82 and 84. This means comprises a pair of longitudinally extending links 88 and 90 having outer ends pivoted to the chutes 34 and 36 and inner ends slidably pivotably attached to vertically swingable rods 92 and 94. The rods 92 and 94 are provided with fixed trunnions 96 and 98 journaled on the walls 24 and 26. The lower ends of rods 92 and 94 are adapted to be sequentially engaged by groups of circumferentially spaced radial lugs 100 and 102 fixed on shaft 28 to impart vertical swinging movement to the rods 92 and 94.

Upstanding rods 104 and 106 rockably supported on walls 14 and 16 are slidably pivoted to the links 88 and 90, extend upwardly through the hopper portions 14 and 16, and are removably engaged with the plates 82 and 84 to move the plates 82 and 84 horizontally as the rods 92 and 94 are swung vertically by lugs 100 and 102. Spring means 108 are engaged with the rods 92 and 94 to yieldingly retain the same vertical.

Any suitable means may be provided for rotating the shaft 28. For example, a pulley P may be fixed to the shaft 28 and disposed between walls 24 and 26 to be operatively connected to a power driven pulley on a motor, within member 12, by an endless pulley belt. The shaft 28 may also be manually rotated.

It is preferred that the cylinders 30 and 32 be constructed of sectional parts, that is, the cylinders 30 and 32 will be provided with cylindrical walls and end walls which are removably secured to the ends of the cylindrical wall. In this manner, the slitted cylindrical walls of cylinders 30 and 32 may be replaced with cylindrical walls having slits of a different size depending upon the type of seeds being handled by the apparatus.

In practical use of the present invention, the seeds that are to be graded, cleaned and treated are placed upon the plates 82 and 84 and the shaft 28 is caused to rotate in order to impart swinging movement to the plates 84 and 82 for sifting the seeds through these plates and into the hopper portions 14 and 16.

The valves 38 and 40 are moved to an open position so that the seeds in the hopper portions 14 and 16 may gravitate into the chutes 34 and 36 to pass downwardly through chute portions 38 and 40 into the cylinders 30 and 32.

As the cylinders 30 and 32 rotate, the cleats C and C' carried thereby will scoop and confine the seeds to the cylindrical walls of the cylinders 30 and 32 so that the material or seeds will cling to the cylinders until the cylinders have been rotated so that the seeds may drop into the troughs 32 and 34.

Augers 59 and 60 will move the seeds within the troughs 40 and 42 toward the outer ends of the trough so that the seeds may pass through the openings O or O'. If it is desired to regrade or re-treat the seeds, then the openings O are uncovered so that the seeds will pass down the baffle plates 62 and 64 back into the cylinders 30 and 32 to again be dumped into the troughs 42 and 44. However, if it is desired to remove the seeds from the troughs 42 and 44, the openings O' are uncovered and the seeds will pass therethrough and into bags or the like disposed under the outer ends of the troughs 42 and 44.

Any foreign matter or small seeds passing through the slits in the cylinders 30 and 32 will pass into the casings 70 and 72 to be brushed by brushes B through the slots S and S'. The outer peripheries of the cylinders 30 and 32 are retained in a cleaned condition by the brushes B' contacting the outer periphery of these rotating cylinders.

What is claimed as new is as follows:

1. Seed grading, cleaning and treating apparatus comprising, a housing member having an upper hopper portion and a downwardly extending discharge chute, valve means carried by said chute for controlling the passage of seed from the hopper portion, a power driven horizontal shaft in the housing member, a perforated hollow cylinder carried by and rotatable with said shaft, said cylinder having an open end into which said chute extends, a horizontal trough supported by said housing member within said cylinder clear of said chute and having a discharge opening, an auger on said shaft within said trough for moving seeds toward said discharge opening, a casing enclosing said cylinder and having a cylindrical wall concentric with said cylinder, said cylindrical wall having outlet openings, means supported within said cylinder for engaging seed to lift seed upwardly with the cylinder to drop seeds into the trough, brushes on the outer periphery of said cylinder engaging the inner periphery of said cylindrical wall to brush material passing through the perforations in said cylinder toward said outlet openings, and means carried by said cylindrical wall for brushing the outer periphery of said cylinder.

2. Seed grading, cleaning and treating apparatus comprising, a housing member having an upper hopper portion and a downwardly extending discharge chute, valve means carried by said chute for controlling the passage of seed from the hopper portion, a power driven horizontal shaft in the housing member, a perforated hollow cylinder carried by and rotatable with said shaft, said cylinder having an open end into which said chute extends, a horizontal trough supported by said housing member within said cylinder clear of said chute and having a discharge opening, an auger on said shaft within said trough for moving seeds toward said discharge opening, a casing enclosing said cylinder and having a cylindrical wall concentric with said cylinder, said cylindrical wall having outlet openings, means supported within said cylinder for engaging seed to lift seed upwardly with the cylinder to drop seeds into the trough, brushes on the outer periphery of said cylinder engaging the inner periphery of said cylindrical wall to brush material passing through the perforations in said cylinder toward said outlet openings, said cylindrical wall having a plurality of slots therein, brushes movable through said slots and engaging the outer periphery of said cylinder to clean the same, and resilient straps securing the last named brushes to said cylindrical wall and permitting the last named brushes to move outwardly through said slots as the first named brushes ride against the last named brushes.

3. Seed grading, cleaning and treating apparatus comprising, a housing member having an upper hopper portion and a downwardly extending discharge chute, valve means carried by said chute for controlling the passage of seed from the hopper portion, a power driven horizontal shaft in the housing member, a perforated hollow cylinder carried by and rotatable with said shaft, said cylinder having an open end into which said chute extends, a horizontal trough supported by said housing member within said cylinder clear of said chute and having a discharge opening, an auger on said shaft within said trough for moving seeds toward said discharge opening, a casing enclosing said cylinder and having a cylindrical wall concentric with said cylinder, said cylindrical wall having outlet openings, means supported within said cylinder for engaging seed to lift seed upwardly with the cylinder to drop seeds into the trough, brushes on the outer periphery of said cylinder engaging the inner periphery of said cylindrical wall to brush material passing through the perforations in said cylinder toward said outlet openings, and means carried by said cylindrical wall for brushing the outer periphery of said cylinder, said trough including an upwardly flared upper longitudinal portion to receive seed being lifted by said seed lifting means.

4. Seed grading, cleaning and treating apparatus comprising, a housing member having an upper hopper portion and a downwardly extending discharge chute, valve means carried by said chute for controlling the passage of seed from the hopper portion, a power driven horizontal shaft in the housing member, a perforated hollow cylinder carried by and rotatable with said shaft, said cylinder having an open end into which said chute extends, a horizontal trough supported by said housing member within said cylinder clear of said chute and having a discharge opening, an auger on said shaft within said trough for moving seeds toward said discharge opening, a casing enclosing said cylinder and having a cylindrical wall concentric with said cylinder, said cylindrical wall having outlet openings, means supported within said cylinder for engaging seed to lift seed upwardly with the cylinder to drop seeds into the trough, brushes on the outer periphery of said cylinder engaging the inner periphery of said cylindrical wall to brush material passing through the perforations in said cylinder toward said outlet openings, and means carried by said cylindrical wall for brushing the outer periphery of said cylinder, said hopper portion having an open top, and a screening plate over the open top of said hopper portion for admitting only seeds of a predetermined size to the hopper portion.

5. The combination of claim 4 wherein said screening plate is hinged to said hopper portion for horizontal swinging movement, and means operatively connected to said screening plate for swinging the same horizontally.

6. The combination of claim 5 wherein said means for swinging the screening plate comprises a linkage carried by the housing member and connected to said screening plate, said linkage including a swinging rod, and circumferentially spaced actuator fingers fixed to said shaft for sequentially engaging and imparting sliding motion to said rod.

7. Seed grading, cleaning and treating apparatus comprising a housing member having an upper hopper portion and a discharge chute extending downwardly from said hopper portion, said discharge chute having a bifurcated lower portion, a power driven horizontal shaft in said housing member, a peripherally slitted sifting cylinder carried by and rotatable with said shaft, said cylinder having an open end receiving the lower portion of said chute, whereby seeds will be directed into the cylinder from the hopper portion, a horizontal seed receiving trough supported by the housing member within the cylinder between the furcations of the bifurcated lower portion of said chute, said trough having a discharge opening communicating with the cylinder and a discharge opening exterior of said housing member, a slide valve carried by said trough for selectively covering said discharge openings, means on the inner periphery of said cylinder for lifting seeds toward the trough, conveyor means on said shaft within said trough for moving seeds in the trough toward said discharge openings, and means in said housing member for cleaning the outer periphery of said cylinder.

8. Seed grading, cleaning and treating apparatus comprising a housing member having an upper hopper portion and a discharge chute extending downwardly from said hopper portion, said discharge chute having a bifurcated lower portion, a power driven horizontal shaft in said housing member, a peripherally slitted sifting cylinder carried by and rotatable with said shaft, said cylinder having an open end receiving the lower portion of said chute, whereby seeds will be directed into the cylinder from the hopper portion, a horizontal seed receiving trough supported by the housing member within the cylinder between the furcations of the bifurcated lower portion of said chute, said trough having a discharge opening communicating with the cylinder and a discharge opening exterior of said housing member, a slide valve carried by said trough for selectively covering said discharge openings, means on the inner periphery of said cylinder for lifting seeds toward the trough, conveyor means on said shaft within said trough for moving seeds in the trough toward said discharge openings, a casing in the housing member enclosing the cylinder and having a cylindrical wall concentric with said cylinder to receive material passing through the slits in said cylinder, said cylindrical wall having outlet slots therein, brushes on the outer periphery of said cylinder riding against the inner periphery of said cylindrical wall to urge material passing through the cylinder toward said slots, and flexibly mounted brushes carried by the cylindrical wall engaging the outer periphery of said cylinder and movable away from the cylinder as the brushes carried by the latter ride against the brushes carried by the cylindrical wall.

9. Seed grading, cleaning and treating apparatus comprising a housing member having an upper hopper portion and a discharge chute extending downwardly from said hopper portion, said discharge chute having a bifurcated lower portion, a power driven horizontal shaft in said housing member, a peripherally slitted sifting cylinder carried by and rotatable with said shaft, said cylinder having an open end receiving the lower portion of said chute, whereby seeds will be directed into the cylinder from the hopper portion, a horizontal seed receiving trough supported by the housing member within the cylinder between the furcations of the bifurcated lower portion of said chute, said trough having a discharge opening communicating with the cylinder and a discharge opening exterior of said housing member, a slide valve carried by said trough for selectively covering said discharge openings, means on the inner periphery of said cylinder for lifting seeds toward the trough, conveyor means on said shaft within said trough for moving seeds in the trough toward said discharge openings, and means in said housing member for cleaning the outer periphery of said cylinder, said hopper portion having an open top, and a horizontally oscillating sifting plate hinged to the hopper portion and extending over the open top of said hopper portion and actuated by said shaft.

References Cited in the file of this patent
UNITED STATES PATENTS

| Number | Name | Date |
|---|---|---|
| 290,914 | Nicholson | Dec. 25, 1883 |
| 309,176 | Warrington | Dec. 9, 1884 |
| 630,336 | Foster | Aug. 8, 1899 |